US012769255B2

United States Patent

Lambert Oberson et al.

(12) United States Patent
(10) Patent No.: US 12,769,255 B2
(45) Date of Patent: Oct. 20, 2026

(54) CERMET AND/OR CERAMIC MULTI-COLOURED ARTICLE AND METHOD FOR MANUFACTURING SAME

(71) Applicant: Comadur SA, Le Locle (CH)

(72) Inventors: Maryline Lambert Oberson, Villers le Lac (FR); Arnaud Actis-Datta, Bassecourt (CH); Bruno Besutti, Charquemont (FR); Alexandre Netuschill, Cerneux-Péquignot (CH)

(73) Assignee: Comadur SA, Le Locle (CH)

( * ) Notice: Subject to any disclaimer, the term of this patent is extended or adjusted under 35 U.S.C. 154(b) by 498 days.

(21) Appl. No.: 17/693,888

(22) Filed: Mar. 14, 2022

(65) Prior Publication Data

US 2023/0015564 A1 Jan. 19, 2023

(30) Foreign Application Priority Data

Jul. 19, 2021 (EP) .................................... 21186468

(51) Int. Cl.

| | |
|---|---|
| ***G04B 45/00*** | (2006.01) |
| ***B28B 1/00*** | (2006.01) |
| ***B28B 11/08*** | (2006.01) |
| ***B28B 11/24*** | (2006.01) |
| ***B28B 23/00*** | (2006.01) |
| ***B44C 1/26*** | (2006.01) |

(Continued)

(52) U.S. Cl.

CPC .......... *G04B 45/0076* (2013.01); *B28B 1/008* (2013.01); *B28B 11/089* (2013.01); *B28B 11/24* (2013.01); *B28B 23/0075* (2013.01); *B44C 1/26* (2013.01); *G04B 19/12* (2013.01); *G04B 37/225* (2013.01)

(58) Field of Classification Search

CPC .. G04B 45/0076; G04B 19/12; G04B 37/225; B44C 1/26

See application file for complete search history.

(56) References Cited

U.S. PATENT DOCUMENTS

| | | | | |
|---|---|---|---|---|
| 2,653,442 A * | 9/1953 | Kupchick .......... | G04B 45/0084 968/392 |
| 7,121,717 B2 * | 10/2006 | Grippo .................. | G04B 37/22 428/209 |
| 9,150,978 B2 * | 10/2015 | Netuschill .............. | G04B 19/18 |

(Continued)

FOREIGN PATENT DOCUMENTS

| | | |
|---|---|---|
| CH | 708 654 A2 | 4/2015 |
| CN | 108 439 997 A | 8/2018 |

(Continued)

OTHER PUBLICATIONS

European Search Report for EP 21 18 6468, dated Dec. 21, 2021.
Korean Office Action dated Feb. 21, 2024 in Korean Application No. 10-2022-0042520.

*Primary Examiner* — Edwin A. Leon
*Assistant Examiner* — Jason M Collins
(74) *Attorney, Agent, or Firm* — Sughrue Mion, PLLC

(57) ABSTRACT

A cermet and/or ceramic multi-coloured article, and in particular a bezel (1) of a timepiece, produced by a method for compressing at least two materials (2, 3) of distinct colours, the article including a relief decoration (8) of a different colour from the rest of the article, the decoration (8) being produced by laser ablation on one of the materials (3) after compression of the two materials (2, 3).

13 Claims, 3 Drawing Sheets

(51) Int. Cl.
*G04B 19/12* (2006.01)
*G04B 37/22* (2006.01)

(56) References Cited

U.S. PATENT DOCUMENTS

| | | | | |
|---|---|---|---|---|
| 9,423,772 | B2 * | 8/2016 | Fernandez Ciurleo | G04B 37/225 |
| 11,654,515 | B2 | 5/2023 | Netuschill et al. | |
| 2005/0136284 | A1 * | 6/2005 | Grippo | G04B 45/0076 428/688 |
| 2013/0208577 | A1 * | 8/2013 | Netuschill | C25D 5/02 205/95 |
| 2015/0092524 | A1 * | 4/2015 | Verdon | G04B 19/12 368/285 |
| 2015/0122774 | A1 * | 5/2015 | Fernandez Ciurleo | G04B 19/12 63/35 |
| 2015/0174863 | A1 * | 6/2015 | Yamashita | G04B 37/22 156/330 |
| 2020/0269356 | A1 * | 8/2020 | Netuschill | B44C 1/225 |

FOREIGN PATENT DOCUMENTS

| | | | |
|---|---|---|---|
| CN | 110 666 931 | A | 1/2020 |
| CN | 111694262 | A | 9/2020 |
| EP | 3 622 846 | A1 | 3/2020 |
| JP | 2014-12615 | A | 1/2014 |
| JP | 2018-20378 | A | 2/2018 |
| KR | 10-2020-0104226 | A | 9/2020 |

* cited by examiner

CERMET AND/OR CERAMIC MULTI-COLOURED ARTICLE AND METHOD FOR MANUFACTURING SAME

CROSS REFERENCE TO RELATED APPLICATION

This application claims priority to European Patent Application No. 21186468.1 filed Jul. 19, 2021, the entire contents of which are incorporated herein by reference.

TECHNICAL FIELD

The present invention relates to an article obtained by multi-compression of ceramics and/or cermets. It relates more particularly to a watch component such as a bezel, produced by compression of ceramic and/or cermet materials of different colours with a colour forming a decoration of the watch component.

PRIOR ART

Ceramic or cermet watch components are generally obtained by a method for injecting or compressing a material followed by sintering. These components often have decoration, such as indexes and numbers for a bezel, which is of distinct colour from the rest of the component. The elements of the decoration are generally added by soldering or gluing on the blank resulting from the sintering. This mechanical assembly between the blank and the decorative elements can be costly and complicated to implement.

An alternative to this mechanical assembly consists, as described in document EP 2 746 243, in impregnating part of the green body before sintering with a solution comprising a metal acting as a pigment. However, this method has the disadvantage that it is difficult to obtain a uniform colour in the mass of the coloured part.

SUMMARY OF THE INVENTION

The object of the present invention is to overcome the aforementioned disadvantages by proposing a new method of multi-material compression of distinct colours, with a subsequent step of machining the decoration in one of the colours.

To this end, the present invention relates to a manufacturing method comprising a laser ablation step to produce the decoration in one of the colours.

More specifically, the invention relates to a method for manufacturing by compression a cermet and/or ceramic multi-coloured article with a relief decoration, said method comprising the following steps:

- Providing at least a first material and a second material, said first material being distinguished from the second material by its colour, said first and second materials being either a ceramic or a cermet,
- Providing at least one compression tool with a first compression tool and optionally a second compression tool,
- Filling and compressing the first material within the first compression tool,
- Filling and compressing the second material on the first material within the first compression tool or within the second compression tool to obtain a green body,
- Sintering the green body to form a blank,
- Machining, by laser ablation, the second material on the green body or on the blank to produce the relief decoration, said second material being hollowed, by laser ablation, at least to the first material to reveal said first material and obtain the relief decoration in said second material standing on the first material,
- Finishing the blank to obtain the article.

Advantageously, the method further comprises another machining step before and/or after the sintering step to dimension the green body and/or the blank respectively.

The present invention also relates to the ceramic and/or cermet article resulting from the manufacturing method. The article according to the invention includes at least two distinct materials that differ by their colour, more generally by their aesthetic appearance. According to the invention, the decorated article is made in one piece without discontinuity between the decoration and the rest of the article, unlike an article decorated by adding the elements of the decoration to the article by soldering or gluing. According to the invention, the decoration has a distinct colour from the rest of the article with a uniform colour in the mass for each colour.

Other features and advantages of the present invention will appear in the following description of a preferred embodiment, shown by way of non-limiting example with reference to the appended drawings.

DETAILED DESCRIPTION

The present invention relates to a manufacturing method by compressing an article made with at least two distinct materials which are either a cermet or a ceramic. The term “distinct materials” means materials that differ in their aesthetic appearance, and in particular their colour. This results in differences in chemical compositions. It can be the same base material with different pigments to change the colour or different base materials. By way of example, it may be the same base material of zirconium oxide with, on the one hand, a black pigment to obtain a black material and, on the other hand, alumina to obtain the colour white. More generally, the ceramics can be nitrides, carbides and/or oxides. Similarly, cermets may include a ceramic phase including carbides, nitrides and/or oxides and a phase of a metallic binder selected, for example, from precious elements such as ruthenium, rhodium, palladium, osmium, iridium, platinum, gold and silver.

Figure 4:
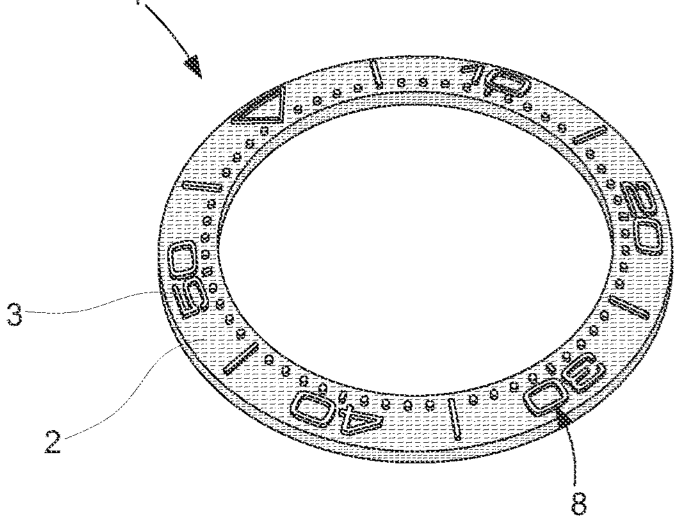
FIG. 4 shows a three-dimensional view of a decorated bezel resulting from the manufacturing method according to the invention.
Figure 5:
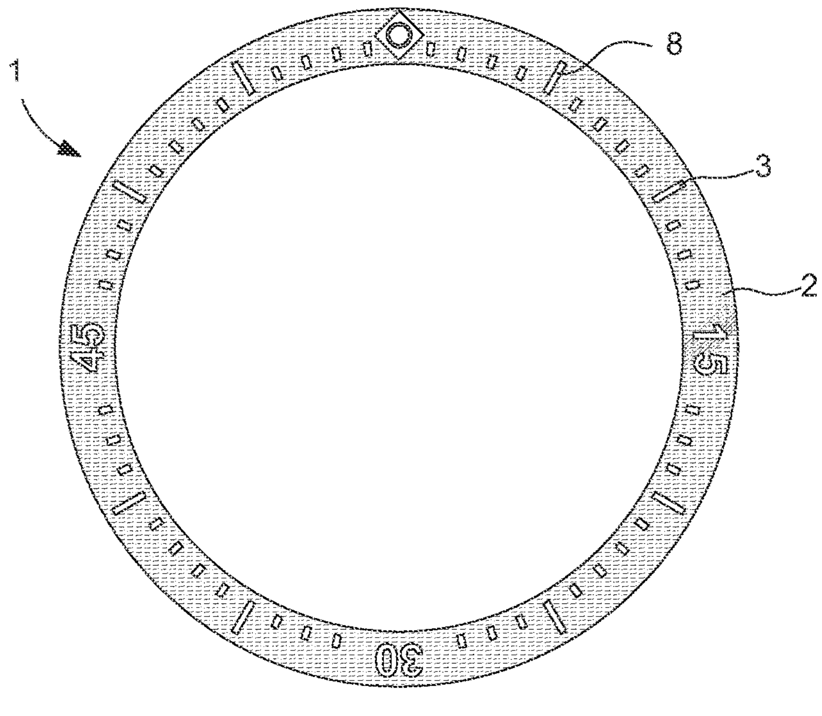
FIG. 5 shows a plan view of another decorated bezel resulting from the manufacturing method according to the invention.

The article according to the invention can be a decorative article such as a constituent element of watches, jewelry, bracelets, etc. In the watchmaking field, this article can be an external component such as a middle part, a back, a bezel, a bezel insert, a push-piece, a crown, a bracelet link, a buckle, a dial, a hand, a dial index, etc. It can also be a component of the movement such as an oscillating mass, a plate, etc. By way of illustration, the article is a bezel 1 made with two ceramics of different colours, for example black and white, with a colour which forms the background and another colour which forms the decoration 8 as shown in FIGS. 4 and 5. Still by way of example, it could be an acronym on a watch crown.

The article is made by compressing different materials to form a green body and by sintering said green body. The manufacturing method is illustrated below for an article comprising two distinct materials, but it could be an article comprising 3, 4, etc. different materials. Similarly, it is illustrated for an article with a decoration of the same colour when there could be decorations of different colours.

The manufacturing method includes the following steps with reference to FIGS. 1 to 5:

- Providing at least a first material 2 and a second material 3, said first material being distinguished from the second material by its colour and therefore by its chemical composition, said first and second materials being either a ceramic or a cermet. Thus, the first and second materials can both be a ceramic or both a cermet or one material can be a ceramic and the other a cermet,
- Providing at least one compression tool with a first compression tool 5 and optionally a second compression tool 6 (FIGS. 1*a*) and 1*e*), FIG. 2*a*)),
- Filling and compressing the first material 2 within the first compression tool 5 (FIGS. 1*b*) and 1*c*)), FIGS. 2*b*) and 2*c*)),
- Filling and compressing the second material 3 on the first material 2 within the first compression tool 5 (FIGS. 2*d*) and 2*e*)) or within the second compression tool (FIGS. 1*g*) and 1*h*)) to obtain a green body 7 (FIGS. 1*i*) and 2*f*)),
- Sintering the green body 7 to form a blank 9 (FIG. 3),
- Machining, by laser ablation, at least the second material 3 on the green body 7 or on the blank 9 to produce a decoration 8 standing on the first material 2 of the green body 7 or of the blank 9, the second material 3 being hollowed to the first material 2 to reveal the latter and leaving in said second material 3 only a decoration 8,
- Finishing the blank 9 to form the article 1.

The laser ablation machining step can be carried out before sintering, that is to say on the green body, or after sintering, that is to say on the blank.

In the presence of more than two materials of different colours, the different materials can be hollowed to draw decorations of different colours. Thus, at least a third cermet or ceramic material of a distinct colour from those of the first and second material is provided. This third material is compressed on the second material in the same compression tool or in another compression tool. The green body is then sintered. The decoration in this third material is produced by laser engraving by hollowing this material to at least the second material to form a decoration standing on the second material. The third material can also be hollowed to the first material to create a decoration standing on the first material. The third material can also be hollowed over one part to the second material and over another part to the first material to produce a decoration standing, for one part, on the first material, and for another part, on the second material.

The laser ablation is preferably carried out with a pulsed laser such as a picosecond, nanosecond or femtosecond laser.

The method may also include another machining step, also called second machining step, intended to dimension the green body and/or the blank. Preferably, it is operated on the green body before sintering so that the material is not too hard. The present invention does not exclude that this machining step is carried out partly before sintering and partly after sintering. Laser engraving to obtain the decoration can also be carried out before or after this other machining step.

The method may optionally include a debinding step before the sintering step if the materials have been injected with a system of organic binders (paraffin, polyethylene, etc.).

Finally, the manufacturing method includes a finishing step such as polishing, satin-finishing, matting, etc.

Figure 1:
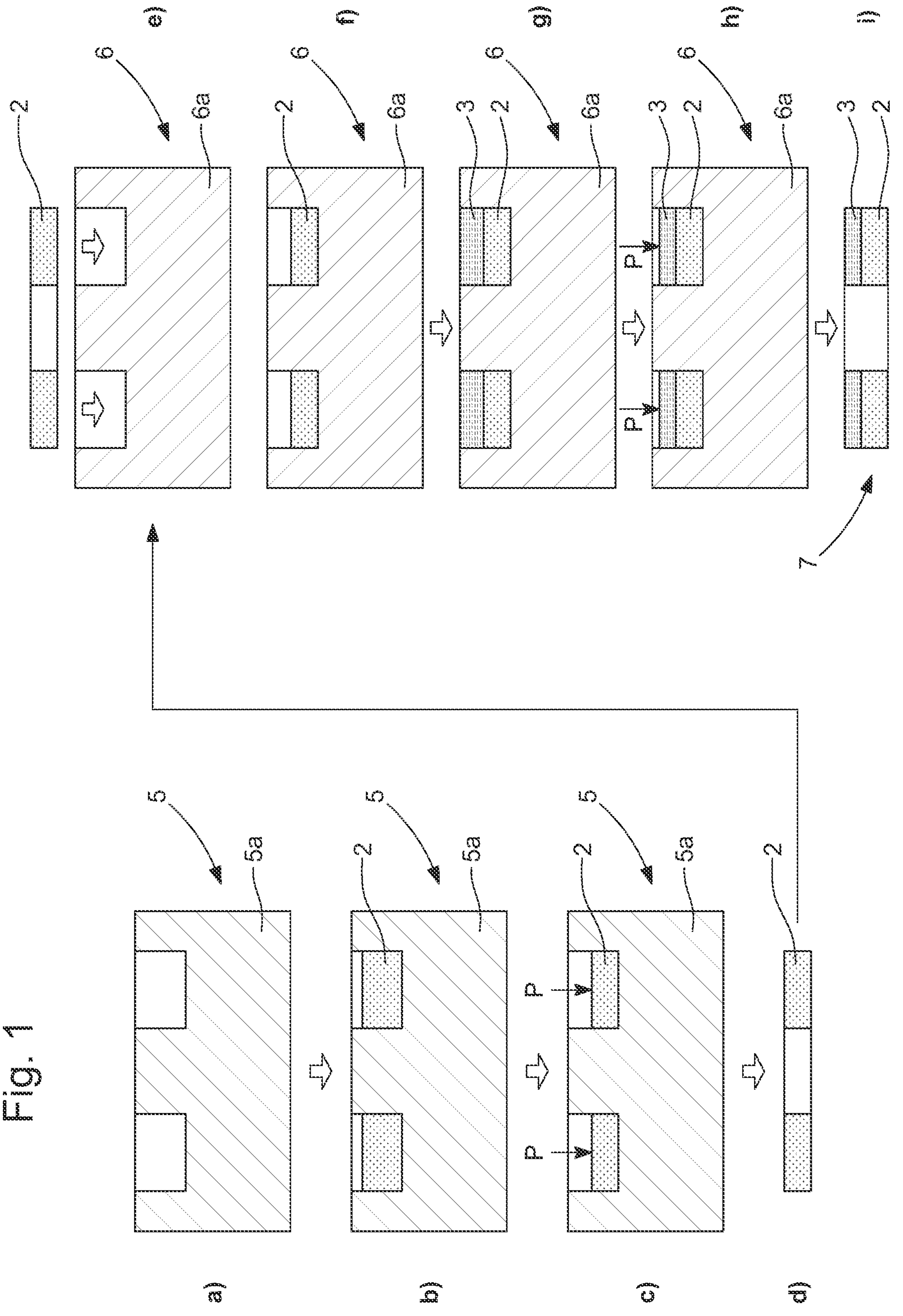
FIG. 1 schematically shows the different steps implemented during the compression of two distinct materials in two different tools.

According to the variant of FIG. 1, the first material 2 is compressed in the first compression tool 5 and the compressed material is extracted from the tool before being introduced into the second compression tool 6. The second material 3 is then compressed on the first material 2 in the second compression tool 6. Advantageously, this second compression tool has dimensions slightly larger than those of the first compression tool because the volume of the first material increases when the pressure is released when transferring to the second compression tool. The green body 7 comprising the two compressed materials is finally extracted from the second tool to perform the sintering, the laser ablation, the second machining step and the finishing step.

Figure 2:
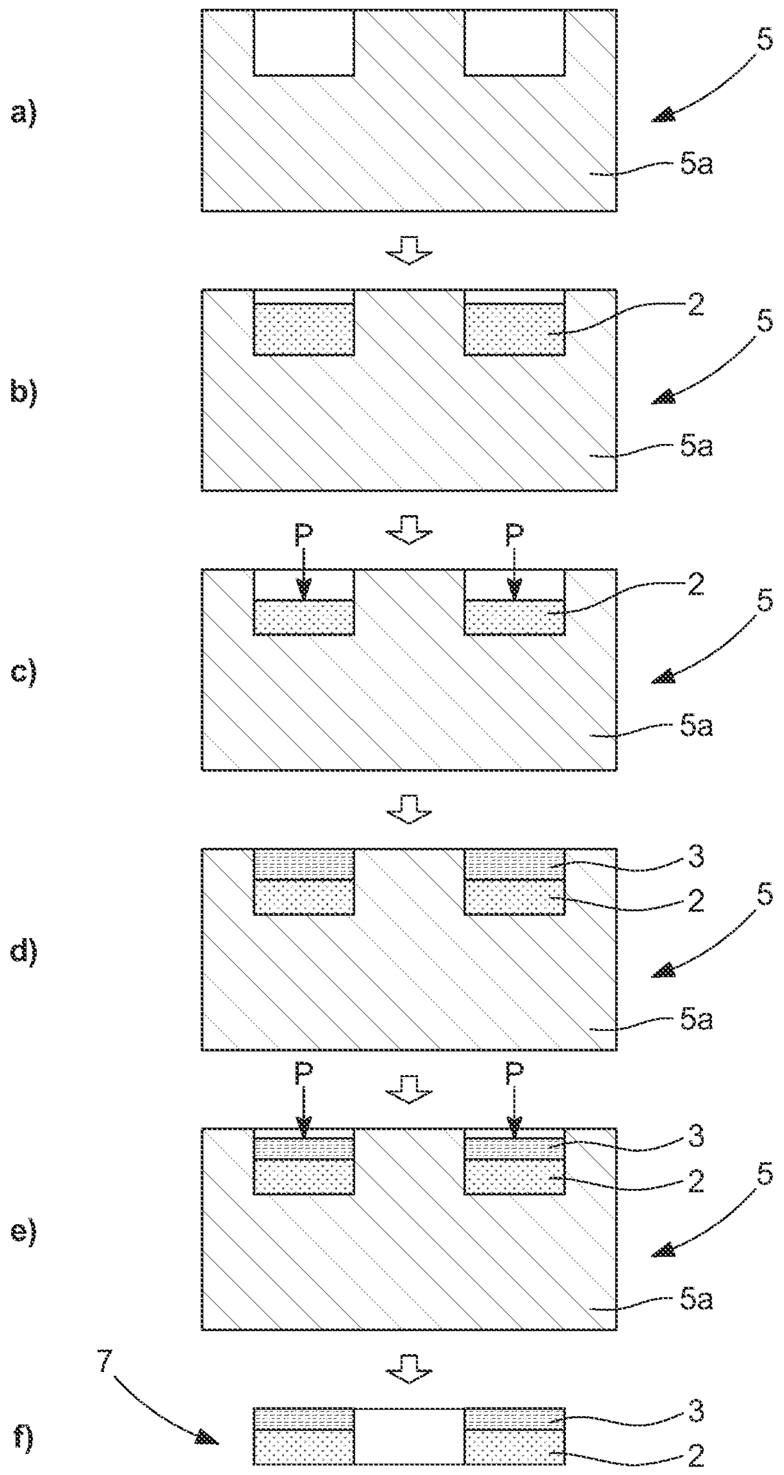
FIG. 2 schematically shows a variant with the different steps implemented during the compression of two distinct materials in a single tool.

According to the variant of FIG. 2, the two materials 2, 3 are compressed within the same compression tool 5.

In the example shown, the compression tool 5, 6, which can also be described as a press, includes a fixed part 5*a* with a mould having a ring-shaped impression for making a bezel, the movable part which ensures the compression of the materials not being shown.

Figure 3:
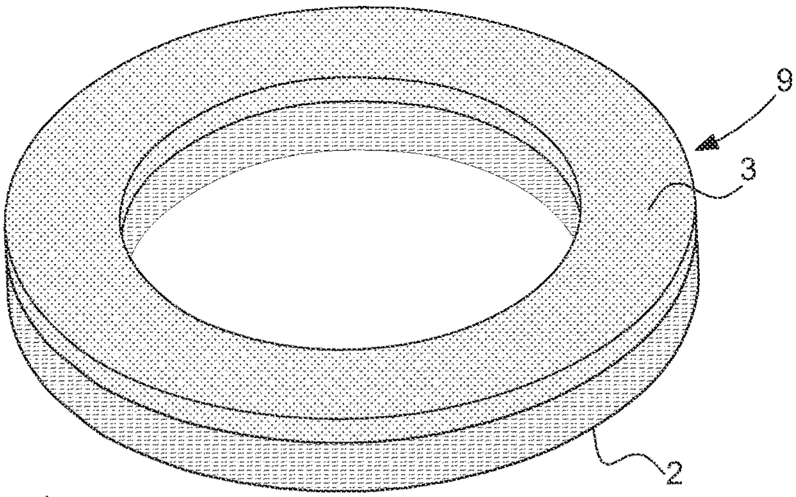
FIG. 3 shows a three-dimensional view of the blank resulting from the bi-compression of materials and the sintering.

FIG. 3 shows the blank 9 resulting from the bi-compression and the sintering with the second material 3 superimposed on the first material 2.

Before or after the sintering and optionally the second machining, the second material 3 is hollowed, by laser ablation, at least to the first material 2 to form the decoration 8 in a distinct colour from the substrate formed by the bezel 1 as shown in FIGS. 4 and 5.

Typically, a bezel 1 according to FIGS. 4 and 5 is obtained by compression of a white zirconia and a black zirconia and by sintering at a temperature of 1400° C. for a time of 48 hours under an oxidising atmosphere.

LEGEND (1) Article, watch component or bezel
(2) First material
(3) Second material
(5) First compression tool
  a. Fixed part of the mould
(6) Second compression tool
  a. Fixed part of the mould
(7) Green body
(8) Decoration
(9) Blank

The invention claimed is:

1. A ceramic and/or cermet multi-coloured article with a relief decoration (8) with a distinct colour from the rest of the article, wherein the relief decoration (8) is made in one piece with the rest of the article and tinted uniformly, the relief decoration (8) comprising at least a first material (2) and a second material (3), the first material (2) being distinguished from the second material (3) by at least colour, the first material (2) and the second material (3) being either a ceramic or a cermet, the first material (2) and the second material (3) overlap each other with the second material (3) having been overlapped and joined to the first material (2) by being pressed onto the first material (2), covering an outermost surface of the first material (2), and then at least partly laser ablated at least to the first material (2) such that part of the outermost surface of the first material (2) is revealed from being covered by the second material (3), the part of the outermost surface of the first material (2) being a majority of the outermost surface of the first material (2), and wherein the second material (3) is extended at least partly from the first material (2).

2. A method for manufacturing by compression the cermet and/or ceramic multi-coloured article of claim 1, said method comprising the following steps:

providing at least the first material (2) and the second material (3);

providing at least one compression tool with a first compression tool (5) and optionally a second compression tool (6);

filling and compressing the first material (2) within the first compression tool (5);

filling and compressing the second material (3) on the first material (2) within the first compression tool (5) or within the second compression tool (6) to obtain a green body (7);

sintering the green body (7) to form a blank (9);

machining, by laser ablation, the second material (3) on the green body (7) or on the blank (9) to produce the relief decoration (8), said second material (3) being hollowed, by laser ablation, at least to the first material (2) to reveal said first material (2) and obtain the relief decoration (8) in said second material (3) standing on the first material (2); and finishing the blank (9) to obtain the article.

3. The manufacturing method according to claim 2, further comprising another machining step to dimension the green body (7) or the blank (9), said other machining step being carried out before or after the step of machining by laser ablation.

4. The manufacturing method according to claim 2, further comprising providing a third material, said third material being distinguished from the second material (3) and from the first material (2) by its colour, said third material being either a ceramic, or a cermet, said third material being compressed on the second material (3) and hollowed, by laser ablation, at least to the second material (3) to obtain the relief decoration (8) in the third material standing on the second material (3) and/or on the first material (2).

5. The manufacturing method according to claim 2, wherein the laser ablation is carried out with a pulsed laser.

6. The article according to claim 1, wherein the article is a watch component of an external part or of a movement.

7. The article according to claim 6, wherein the watch component of the external part or of the movement is a bezel.

8. The article according to claim 6, wherein the decoration (8) is made of a white zirconia and the rest of the article of a black zirconia.

9. The article according to claim 1, wherein the article is a bezel (1) with the relief decoration (8) formed at least by indexes and numbers.

10. The article according to claim 1, wherein an entirety of the second material (3) is outside of the first material (2).

11. The article according to claim 1, wherein the first material (2) and the second material (3) are both opaque.

12. The article according to claim 1, wherein the second material (3) is protruded from the first material (2) in a first direction, and wherein the first material (2) has a greater length along the first direction than does the second material (3) along the first direction.

13. The article according to claim 1, wherein the second material (3) is covering an entirety of the outermost surface of the first material (2).

* * * * *